United States Patent
Unidad et al.

(10) Patent No.: US 11,752,554 B2
(45) Date of Patent: Sep. 12, 2023

(54) METHODS AND SYSTEMS FOR PRINTING GRADED MATERIALS BY ROLLER-BASED DEPOSITION OF MULTIPLE POWDERS

(71) Applicant: Palo Alto Research Center Incorporated, Palo Alto, CA (US)

(72) Inventors: Jerome Unidad, San Francisco, CA (US); Kathryn F. Murphy, Redwood City, CA (US)

(73) Assignee: Xerox Corporation, Norwalk, CT (US)

( * ) Notice: Subject to any disclaimer, the term of this patent is extended or adjusted under 35 U.S.C. 154(b) by 112 days.

(21) Appl. No.: 17/133,712

(22) Filed: Dec. 24, 2020

(65) Prior Publication Data

US 2022/0203447 A1 Jun. 30, 2022

(51) Int. Cl.
*B22F 10/10* (2021.01)
*B33Y 10/00* (2015.01)
(Continued)

(52) U.S. Cl.
CPC ............... *B22F 10/10* (2021.01); *B22F 10/40* (2021.01); *B22F 10/85* (2021.01); *B22F 12/63* (2021.01);
(Continued)

(58) Field of Classification Search
CPC .................. B23K 15/086; B28B 1/001; B22F 2003/1057
See application file for complete search history.

(56) References Cited

U.S. PATENT DOCUMENTS

| 3,772,013 A | 11/1973 | Wells |
| 9,101,979 B2 | 8/2015 | Hofmann et al. |

(Continued)

FOREIGN PATENT DOCUMENTS

| CN | 101384405 | * | 3/2009 |
| SE | WO2014109699 | * | 7/2014 |

(Continued)

OTHER PUBLICATIONS

Tan, X.P. et al. "Metallic powder-bed based 3d printing of cellular scaffolds for orthopaedic implants: a state-of-the-art review on manufacturing, topological design, mechanical properties, and biocompatibility." 2017. Materials science and engineering. 76. p. 1328-1343. (Year: 2017).*

(Continued)

*Primary Examiner* — Nicholas A Wang
(74) *Attorney, Agent, or Firm* — Caesar Rivise, PC

(57) ABSTRACT

According to aspects of the embodiments, there is provided method and system of using a roller-based deposition process to place two or more powders at some level of precision to build a multi-material, functionally-graded part. Instead of formulating a liquid ink by dispersing the powder feedstocks (metal or ceramic) in some binder-solvent mixture, there is detailed the use of two different types of fluid deposited in a digital manner on the roller surface. The two different types of fluids create a "wetted pixel" that can then capture a specific powder type with an affinity only to that fluid. Alternatives such as electrostatics, electrophotography, and the like are also provided to be used exclusively or with fluids to create an affine pixel to a particular powder type.

22 Claims, 8 Drawing Sheets

(51) Int. Cl.
*B33Y 30/00* (2015.01)
*B33Y 50/02* (2015.01)
*B29C 64/393* (2017.01)
*B29C 64/141* (2017.01)
*B29C 64/40* (2017.01)
*B29C 64/165* (2017.01)
*B29C 64/218* (2017.01)
*B22F 10/85* (2021.01)
*B22F 10/40* (2021.01)
*B22F 12/63* (2021.01)
*B28B 1/00* (2006.01)
*B28B 17/00* (2006.01)

(52) U.S. Cl.
CPC .......... *B28B 1/001* (2013.01); *B28B 17/0081* (2013.01); *B29C 64/141* (2017.08); *B29C 64/165* (2017.08); *B29C 64/218* (2017.08); *B29C 64/393* (2017.08); *B29C 64/40* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 9,821,339 | B2 | 11/2017 | Paschkewitz et al. |
| 2015/0137404 | A1 | 5/2015 | Tuchinskiy |
| 2016/0368055 | A1* | 12/2016 | Swaminathan ........ B33Y 10/00 |
| 2017/0130591 | A1* | 5/2017 | Bunker .................. F01D 5/186 |
| 2017/0334141 | A1 | 11/2017 | Burton |
| 2017/0361637 | A1* | 12/2017 | Taniuchi ............... B41F 19/002 |

FOREIGN PATENT DOCUMENTS

WO WO2016/205743 A1 12/2016
WO WO2019/178138 A2 9/2019

OTHER PUBLICATIONS

Gibson, I. et al. "Additive manufacturing technologies." Springer. 2015. (Year: 2015).*
Extended European Search Report from corresponding European Patent Application No. 21214602.1 dated Jun. 13, 2022.

* cited by examiner

METHODS AND SYSTEMS FOR PRINTING GRADED MATERIALS BY ROLLER-BASED DEPOSITION OF MULTIPLE POWDERS

FIELD OF DISCLOSURE

This disclosure relates to fabrication of multi-scale heterogeneous materials, more particularly to fabrication of these materials by roller-based deposition of multiple powders.

BACKGROUND

Additive manufacturing, also known as three dimensional (3D) printing, allows for the creation of three-dimensional objects by depositing desired material or materials in successive layers. Prior to printing, the materials are stored in one or more reservoirs of a 3D printer and are extruded through one or more heads of the printer that move to extrude the desired materials at different points in the layer while moving in predefined paths. While the extrusion is relatively straightforward when the materials stored the reservoirs are extruded from one of the heads in isolation, the extrusion becomes more complicated when a functionally graded material ("FGM") has to be created using 3D printing or similar fused deposition modeling ("FDM") printing. An FGM is a composite of two or more input materials whose concentrations vary in different portions of the FGM, with the portions possessing properties that are hybrids of the properties of the input materials, with the properties depending on the relative amounts of the input materials within the respective portions. Examples of functionally graded materials in nature include organic structures, such as muscle tissue smoothly transitioning into tendon to allow for a strong bond with strain-relief when connecting to a rigid bone. Similarly, in 3D printing, the ability to manufacture an FGM allows to create highly optimized part designs meant to meet bulk performance requirements, such as weight, elasticity in particular directions, and rigidity in other directions.

Creation of an FGM requires mixing two or more of the input materials in desired proportions within a 3D printer and then extruding the mix in points of the FGM where the proportions are necessary. Such mixing is performed in a chamber within the printer into which the input materials are supplied from the storage reservoirs and from which the mix is extruded through the printing head. The composition in the mix within the mixing chamber can change only at a certain rate, which is governed by both the characteristics of the printer and an initial composition of the mix, and the printer head is limited by this rate of change in being able to extrude the mix of a certain composition. Thus, if a predefined path of the extruding head requires the head to extrude the mix of compositions not compatible with the rate of change, the printer head would not be able to comply with the extrusion command and an FGM could not be printed properly without purging the contents of the mixing chamber. Such a purging would not only significantly slow down the printing process, but would also waste materials in the mixing chamber.

Existing techniques, which can be characterized as combinations of micro-mixing and extrusion, still have several issues that must be resolved such as the ability to deal with high viscosity inks, the ability to perform on-the-fly mixing to a change in gradient, and the ability to deal with speed of completion. For these reasons there is a need in the art for making 3D parts with graded material properties with potential for gradient resolution at the particle size in one dimension (z) and gradient resolutions of a linear order of the particle size in the other two directions (x, y).

SUMMARY

According to aspects of the embodiments, there is provided methods and systems of using a roller-based deposition process to place two or more powders at some level of precision to build a multi-material, functionally-graded part. Instead of formulating a liquid ink by dispersing the powder feedstocks (metal or ceramic) in some binder-solvent mixture, there is detailed the use of two different types of fluid deposited in a digital manner on the roller surface. The two different types of fluids create a "wetted pixel" that can then capture a specific powder type with an affinity only to that fluid. Alternatives such as electrostatics, electrophotography, and the like are also provided to be used exclusively or with fluids to create an affine pixel to a particular powder type.

BRIEF DESCRIPTION OF THE DRAWINGS

Various exemplary embodiments of the disclosed apparatuses, mechanisms and methods will be described, in detail, with reference to the following drawings, in which like referenced numerals designate similar or identical elements, and.

DETAILED DESCRIPTION

Figure 1:
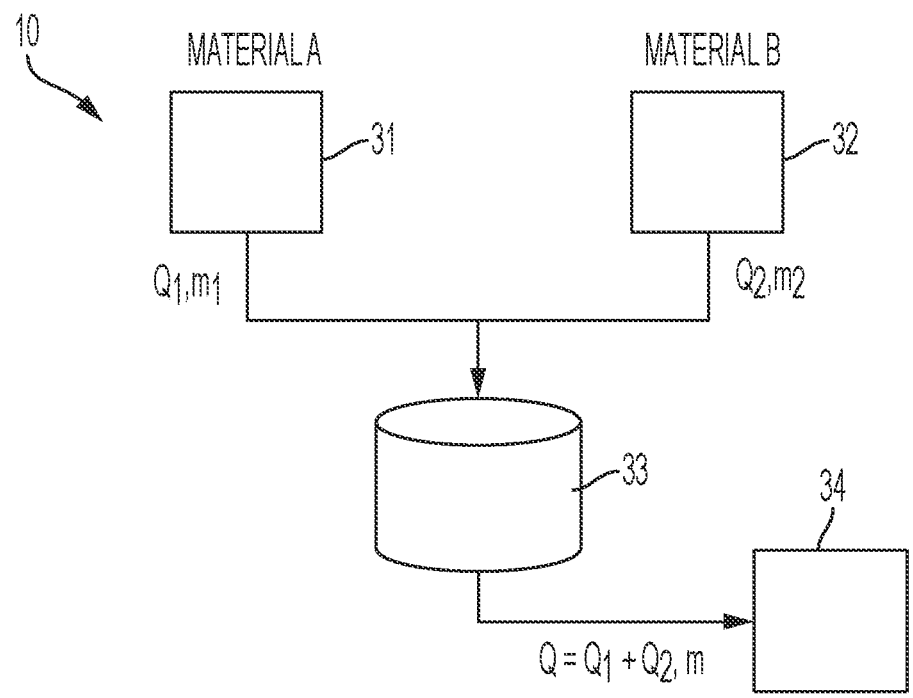
FIG. 1 is a schematic diagram of a prior art system to change the composition of a material mixture that can be extruded on the characteristics of the 3D printer.

Illustrative examples of the devices, systems, and methods disclosed herein are provided below. An embodiment of the devices, systems, and methods may include any one or more, and any combination of, the examples described below. This invention may, however, be embodied in many different forms and should not be construed as limited to the embodiments set forth below. Rather, these exemplary embodiments are provided so that this disclosure will be thorough and complete, and will fully convey the scope of the invention to those skilled in the art. Accordingly, the exemplary embodiments are intended to cover all alternatives, modifications, and equivalents as may be included within the spirit and scope of the apparatuses, mechanisms and methods as described herein.

In one aspect, a method to fabricate hierarchical, graded materials, comprising treating selected regions of a roller surface to induce affinity of a powder type to a specific pixel on the roller surface; running the roller surface after treating across one or more powder beds to cause particles to transfer only to the treated selected regions of the roller surface, thereby causing powder to adhere to the selected regions of the roller surface; wherein the one or more powder beds have a powder feedstock whose affinity is specific to the treated selected regions of the roller surface; and fabricating the graded materials in a layer-by-layer basis by depositing to a substrate the powder on the roller surface.

In another aspect, the method wherein the treating of the selected regions is selected from a group consisting of fluids, electrostatics, electrophotography, or a combination thereof.

In another aspect the method further providing at least one reservoir that supplies fluids to multiple print heads.

In yet another aspect, the method wherein the treating further comprising actuating at least one of the multiple print heads in communication with at least one reservoir to deposit a defined volume of at least one of the fluids on the selected regions of the roller surface.

In still another aspect, the method wherein the deposited fluid from at least one of the fluids causes that region of the roller surface to have an affinity to a specific type of particle the one or more powder beds.

In yet another aspect, wherein the treating of selected regions when using more than one powder bed is performed sequentially or simultaneously.

In another aspect, wherein the powder feedstock is selected from a group consisting of metallic, ceramic, alloy, low-temperature alloy, high-temperature alloy, nonmetallic, polymeric, composite materials and mixtures thereof that permits deposition of the powder on the substrate.

In another aspect, further comprising: applying energy to the selected regions of the roller surface to thereby release the powder particles onto the substrate.

In yet another aspect, further applying support material in a layer-wise manner according to a pattern defined for supporting the graded materials during fabrication, wherein a layer of support material is applied subsequent to forming a corresponding layer of powder on the substrate.

In another aspect, wherein the applied energy causes fluids on the selected regions of the roller surface to evaporate to thereby release the powder particles.

In still yet a further aspect, a system for fabricating an object, comprising a treatment subsystem to treat selected regions of a roller surface to induce affinity of a powder type to a specific pixel on the roller surface; a processor coupled to a storage device having instructions that, when executed by the processor, cause the processor to execute a method to fabricate hierarchical, graded materials, by: running the roller surface after treating across one or more powder beds to cause particles to transfer only to the treated selected regions of the roller surface, thereby causing powder to adhere to the selected regions of the roller surface; wherein the one or more powder beds have a powder feedstock whose affinity is specific to the treated selected regions of the roller surface; fabricating the graded materials in a layer-by-layer basis by depositing to a substrate the powder on the roller surface.

It is initially pointed out that description of well-known starting materials, processing techniques, components, equipment and other well-known details may merely be summarized or are omitted so as not to unnecessarily obscure the details of the present disclosure. Thus, where details are otherwise well known, we leave it to the application of the present disclosure to suggest or dictate choices relating to those details. The drawings depict various examples related to embodiments of illustrative methods, apparatus, and systems for printing and using an in-line air bearing heater after application of surface coatings on a recording media.

When referring to any numerical range of values herein, such ranges are understood to include each and every number and/or fraction between the stated range minimum and maximum. For example, a range of 0.5-6% would expressly include the endpoints 0.5% and 6%, plus all intermediate values of 0.6%, 0.7%, and 0.9%, all the way up to and including 5.95%, 5.97%, and 5.99%. The same applies to each other numerical property and/or elemental range set forth herein, unless the context clearly dictates otherwise.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

The term "affinity" as used herein refers to a liquid, electric charge, or electrophotography pixel which binds specifically to a target particle or target molecule(s) in a powder bed. It is well known in the art that an affinity does not have to bind its target particle in its entirety but instead usually interacts with a defined part thereof.

A "hierarchical material" is a material having structures spanning multiple orders of magnitude of length scale. A "graded material" is a material having a continuous and smooth spatial gradient of composition. A "digital material" has controlled spatial composition and form, i.e., the spatial composition being two planar 2D dimensions (X-Y) and Z dimension that makes the 3D. The unit of a digital material is a voxel, which is a three-dimensional droplet or characteristic volume of material. A "multi-material composite" is a material composed of a suspending material, which may be metal, ceramic or polymer, also known as the matrix, and a dispersed reinforcing material, which may be in a continuous or discontinuous phase, also known as the filler or the reinforcement. The reinforcing material may comprise of colloidal clays, carbon nanotubes, or macroscopic additives like carbon fibers or ceramic platelets.

The term "printing device" or "printer" as used herein encompasses any apparatus that performs a print outputting function for the purpose of solid freeform fabrication ("SFF") which encompasses a class of manufacturing methods which allow the fabrication of three-dimensional structures directly from computer-aided design ("CAD") data. SFF processes are generally additive, in that material is selectively deposited to construct the product rather than removed from a block or billet. Nearly arbitrary product geometries are achievable with SFF, no tooling is required, mating parts and fully assembled mechanisms can be fabricated in a single step, and multiple materials can be combined, allowing functionally graded material properties. So as used herein a printer includes 3D printer that can make a 3D object, and the like such as a functionally graded material ("FGM") printer, fused deposition modeling ("FDM") printer, and stereolithography ("SLA") printer. It will be understood that the structures depicted in the figures may include additional features not depicted for simplicity, while depicted structures may be removed or modified.

The term "controller" is used herein generally to describe various apparatus relating to the operation of one or more device that directs or regulates a process or machine. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

The examples further include at least one machine-readable medium comprising a plurality of instructions, when executed on a computing device, to implement or perform a method as disclosed herein. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. In additive manufacturing, example of these modules can include one or more roller modules to operate rollers to follow a desired sequence, fabrication module to deposit material on a substrate or build platform, applicator module, actuator module to cause print heads to deposit material in a particular sequence, and energy applicator module. Computer-executable instructions, associated data structures, and program modules represent examples of the program code means for executing steps of the methods disclosed herein. The particular sequence of such executable instructions or associated data structures represents examples of corresponding acts for implementing the functions described therein.

Although embodiments of the invention are not limited in this regard, discussions utilizing terms such as, for example, "processing," "computing," "calculating," "determining," "using," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The to be described embodiments of roller-based deposition are useful for fabricating graded materials particularly for metal-ceramic, metal-metal and ceramic-ceramic composites which are typically fabricated in ways that are non-digital and not 3D printing based. Using the invention, the fabricated 3D objects would have the desired geometries (benefit of 3D printing) and with digital gradients, i.e., pixel by pixel, designed to suit the intended geometry. In addition, roller-based deposition offers resolution of material gradients up to the scale of the powder size in z and a few powder sizes (approx. 2-5×) in x and y.

In describing the embodiment of the present invention the portions which are the same as those in a prior described embodiment are denoted by the same reference numerals, and descriptions of the same portions as those as in a prior embodiment will be omitted.

FIG. 1 is a schematic diagram of a prior art system to change a composition of a material mix that can be extruded on the characteristics of the 3D printer.

The illustrated prior art system 10 is heavily dependent on the rate of change of a composition of a material mix that can be extruded on the characteristics of the 3D printer. Such dependence makes it difficult to do on-the-fly mixing and to ascertain reliable resolution. Two storage reservoirs 31, 32 hold two different input materials, designated as material A and material B. The reservoirs 31, 32 are connected to a mixing chamber 33, where the input materials can be mixed and from where an output material supplied into the printing head 34 for extrusion printing of the part. Extrusion printing of parts has several issues like the inability to deal with high viscosity inks which has significant pressure requirements for printing at small part resolution (e.g. 100 micron diameter tracks); challenges with on-the-fly mixing where the mixer can change gradients (i.e. switch from 100% A to 100% B) easily in the span of a few voxels; an inability, in a voxel context, to predictably pinpoint the smallest gradient resolution that can be achieved (i.e. . . . 49%, 50%, 51% vs. 49.5%, 50%, 50.5%); and most importantly an inherent trade-off exists between print resolution and printing speed with the upper bound of the printing speed matching that of fused deposition modeling (FDM) printers. The upper bound in printing speed is inherent in all serial, point deposition-based 3D printing processes. In addition, depending on the specifics of the extruder system, the minimum addressable volume maybe large. In some auger-based displacement systems, this minimum addressable volume which corresponds to the floor voxel size for defining gradients in composition maybe anywhere in the range of 0.5-5 microliters which translates to a cube with dimensions of 0.79-1.71 mm on each side. This is considerably large compared to the size of the powders which are between 1-100 microns in diameter.

Figure 2:
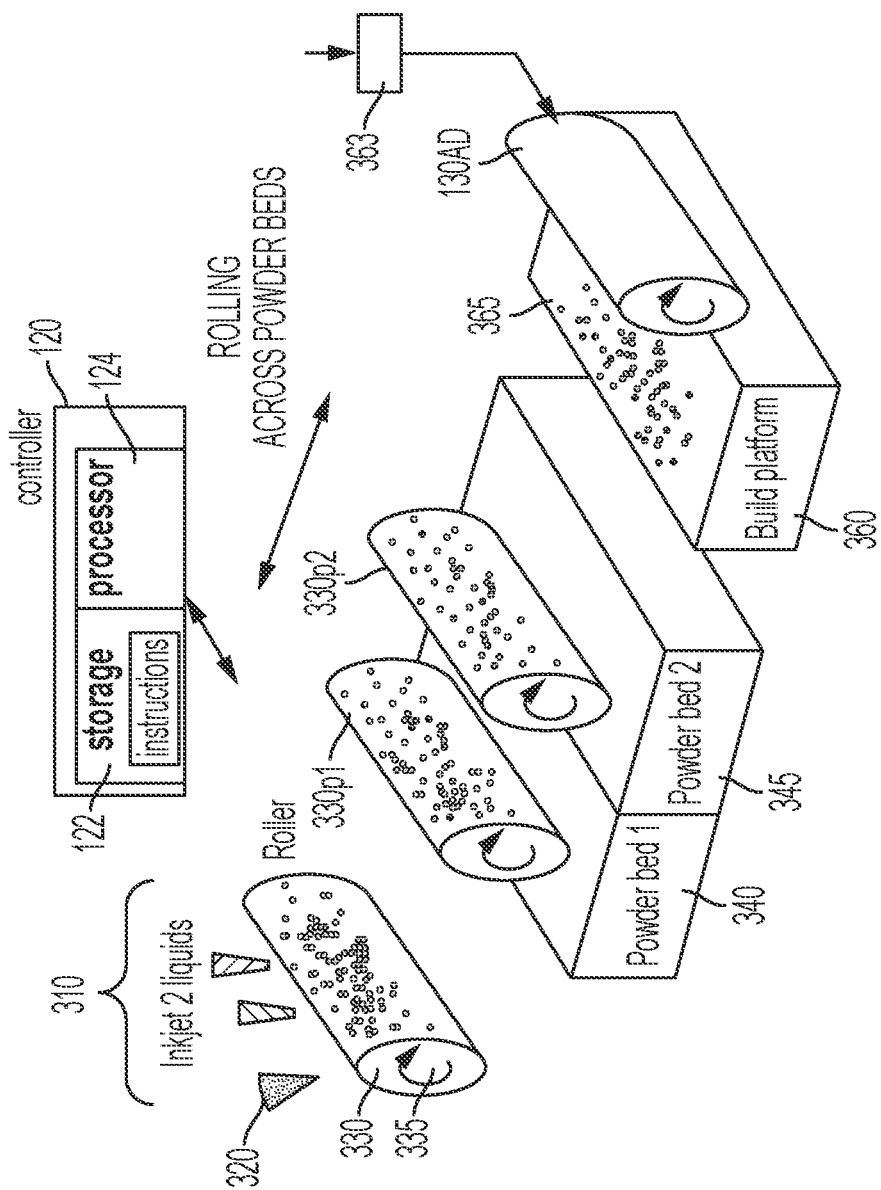
FIG. 2 is a schematic diagram of a system for roller-based deposition of multiple powders useful for making 3D parts in accordance to an embodiment.

FIG. 2 is a schematic diagram of a system for roller-based deposition of multiple powders useful for making 3D parts in accordance to an embodiment.

The illustrated system comprises roller 330, treatment subsystem comprising inkjet heads 310 and exposure device 320 that is non-fluid, controller 120, powder beds (340, 345)

with feedstock that have an affinity to specific pixel in the roller as induced by the treatment subsystem, and a build platform 360 such as a substrate to grow the fabrication on a layer-by-layer basis.

The ink-jet heads 310 are capable of depositing multiple (e.g., two or more) fluids simultaneously without fluid changes. An important benefit of ink-jetting for fluid deposition is fine resolution (up to the scale of powder feedstock) or high resolution of material gradients, especially when working with materials whose functionality depends on their being produced in thin films. The very small volumes achievable with ink-jet droplets (e.g. picoliters) are especially well suited to this. Ink-jet droplets of multiple fluids jetted into the same location will react very quickly, permitting the local control of chemical reactions or physical interactions (e.g. wetting) within deposited material, allowing very small-scale structuring of chemical activity, wetting and other resultant material properties to affine to a particular feedstock. Ink-jet heads 310 are capable of dispensing droplets in a defined volume of 2-50 picoliters of at least one of the fluids or both on selected regions of the roller surface 330. The high resolution and point-by-point deposition of material permits structures (such as linear features whose material varies with length, or multi-material lattices) to be practically realized, making the products of an ink-jet tool at a minimum complementary to those that can be achieved by a stream-type deposition tool such as an extrusion/syringe tool.

Returning to FIG. 2, the embodiment shows the use of a roller-based deposition process to place two or more powders at some level of precision to build a multi-material, functionally-graded part at a substrate such as build platform 360. Instead of formulating a liquid ink by dispersing the powder feedstocks (metal or ceramic) in some binder-solvent mixture, to be used in a printing system like shown in FIG. 1, the embodiment depicted in FIG. 2 shows the direct placement of the powder onto the build platform using a roller 330.

The idea is to use two different types of induced affinity with fluids by treating the roller, and for each "wetted pixel" to then capture a specific powder type with an affinity only to that fluid. To get the powder to stick to the roller surface (330) at select parts, the embodiment inkjets (310) a defined volume of fluid onto the roller surface or in the alternative uses an exposure device 320 that will cause temporary powder adhesion to the roller surface when the roller is run across (330p1, 330p2) a powder bed (340, 345). In the release step, any liquid can be forced to evaporate using an energy device 363 thereby releasing the powder particle into the build platform 360 or substrate. The powder already in the build platform 360 may or may not also be wet with the same liquid or a different liquid such as an adhesive to then allow powder particle transfer between the roller and the build platform. To achieve functional grading using two or more different powders like powder bed 340 and power bed 345, the system can inkjet two or more different fluids whose affinity is specific to the powder feedstock. In the main embodiment, this could be one hydrophilic and one hydrophobic liquid which can be designed to attract or adhere to a bare metal/ceramic particle (hydrophilic) or to a wax- or polymer-covered metal/ceramic particle (hydrophobic). Such powder feedstocks (340, 345) are available for conventional metal and ceramic manufacturing processes. Wax or polymer-covered metal particles, for example, are typically used in metal injection molding. The intended process is then to sequentially or simultaneously inkjet (310) the two fluids onto the roller surface 330 (making a pixel map of the intended multi-material or graded structure within a layer) and then run the roll 330 sequentially into two powder beds (340, 345) to get the two powder types to stick the roller. These powders, using instructions in the fabrication module, are then all transferred 365 to the build platform 360 to fabricate the part in a layer-by-layer fashion. Support material can be introduced by either inkjet deposition of a liquid wax that solidifies or by doctoring a support powder material like shown in FIGS. 5a-5b and FIG. 6. These support materials could be designed to burn off during post-print sintering, to melt away at an elevated temperature or to be removed by de-powdering. For powder (365) with a mean diameter of 10 microns, the disclosed embodiments can achieve x-y placement resolution of the order of 20-50 microns (the rough area covered by inkjet droplet on some compatible substrate) and z placement resolution of the order of 10 microns (the mean diameter size). Both these dimensions are at least an order of magnitude smaller than the dimensions of a cubic voxel corresponding to the minimum addressable volume of some paste extrusion systems, which are as large as 0.79 to 1.71 mm.

The exemplary control system 120 may include one or more local processors 124 for individually operating the exemplary control system 120 and for carrying into effect control and operating functions for additive manufacturing ("AM") 3D object forming like fabrication using graded materials, and specifically for implementing a fluid, electrostatic, or electrophotographic pixel forming scheme. Processor(s) 124 may include at least one conventional processor or microprocessor that interpret and execute instructions to direct specific functioning of the exemplary control system 120, and control of the AM 3D object forming process with the exemplary control system 120.

The exemplary control system 120 may include one or more data storage devices 122. Such data storage device(s) 122 may be used to store data or operating programs to be used by the exemplary control system 120, and specifically the processor(s) 122. Data storage device(s) 122 may be used to store information regarding, for example, one or more 3D object models for producing 3D objects in an AM 3D object forming device with which the exemplary control system 120 is associated. The stored 3D object model information may be devolved into data for the printing of a series of 2D slices—useful for creating pixel image on the surface of roll 330—for forming the 3D object in the manner generally described above with respect to build platform 360. The data storage device(s) 122 may include a random access memory (RAM) or another type of dynamic storage device that is capable of storing updatable database information, and for separately storing instructions for execution of system operations by, for example, processor(s) 124.

In the depicted embodiment the roll 330 rotates clockwise 335 and starts with a clean surface. Disposed at a first location of the treatment subsystem is a fluid type of device 310 that ejects a fluid with an affinity to a specific powder type and to form an image thereon. The fluid type device as shown is one or more inkjet print heads to uniformly wet a selected part of the roll surface, such as a pixel like shown in FIG. 4A, with one or more fluids to form a layer having a uniform and controlled thickness, and cause a particular powder to adhere to its surface at the selected location. In this way fluids could be paired by ink jetting two or more different fluids whose affinity is specific to the powder feedstock. A sensor (not shown), such as an in-situ non-contact laser gloss sensor or laser contrast sensor, can be used to confirm the uniformity and position of the layer. FIG.

3 shows an isometric view of a roller with different materials in accordance to an embodiment.

Other forms of image creation and methods of inducing affinity of a powder type to a specific pixel in the roller 330 that does not use fluids: e.g. electrostatics, electrophotography, and the like. The same fluid-powder pair approach can be used for the 1st material fluid based and 2nd material electrophotography or electrostatic based. Well known exposure device 320 for creating a pixel image include a raster output scanner (ROS), which illuminates the charged portion of the exterior surface of roll 330 to record a first electrostatic latent image thereon, a light emitting diode (LED) print head which emits an irradiating exposure light, or other electrostatic interaction with an induced negative charge placed on the roll 330 through a mechanism using corona discharge which recharges to a relatively high, substantially uniform potential or a similar mechanism.

Figure 3:
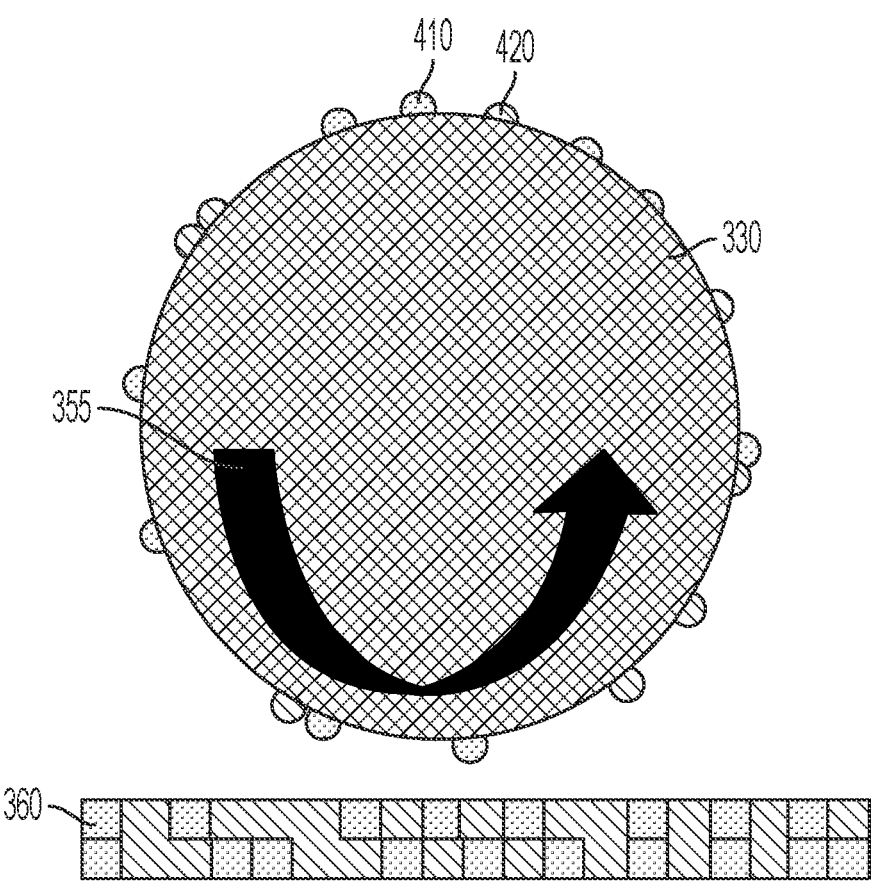
FIG. 3 shows a roller and build platform of FIG. 1 with different materials in accordance to an embodiment.

FIG. 3 shows a view of a roller with different materials in accordance to an embodiment. In the illustrated embodiment, the roll 330 is shown rotating 335, counter-clockwise in this depiction, to place a first type of particle 410 and a second type of particle 420 on the build platform such as substrate 360. As shown the particles can be spread to any location of the surface of the roll 330 and gradually used to build fabrication part.

Figure 4B:
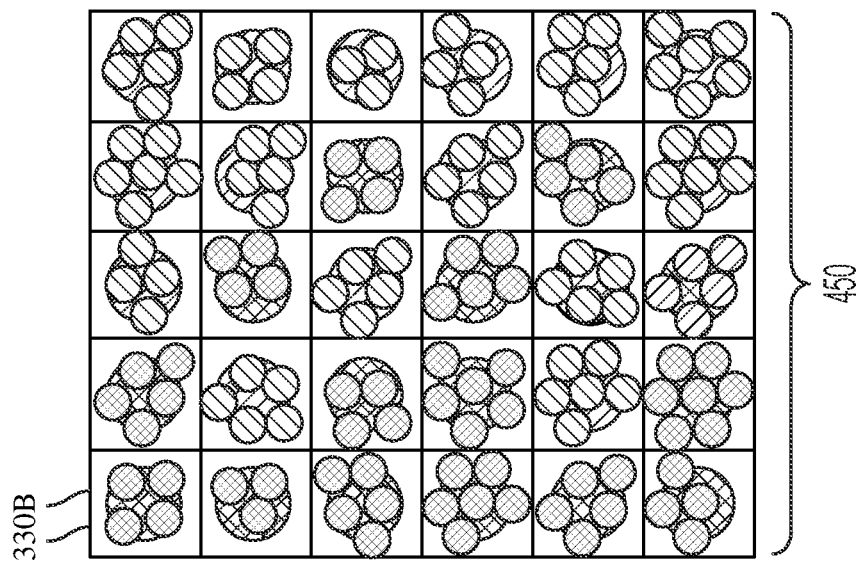
FIG. 4A shows a 2D representation of a roller surface after inducement of two affine treatments, and in FIG. 4B a representation of particles that have an affinity to the applied treatment in accordance to an embodiment.
Figure 4A:
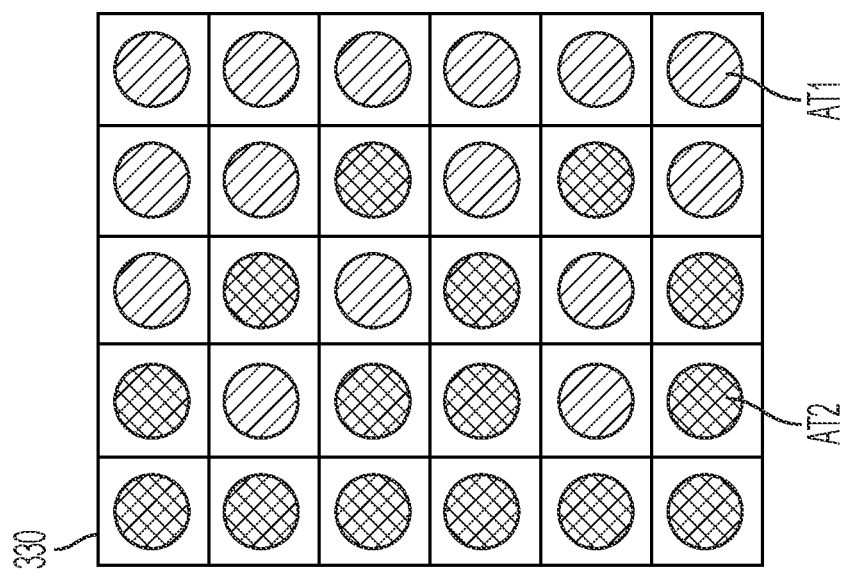

FIG. 4A shows a 2D representation of a roller surface after inducement of two affine treatments, and in FIG. 4B a representation of particles that have an affinity to the applied treatment in accordance to an embodiment. FIG. 4A is a 2D representation of a selected region of roll 330. The selected area details the use of two different types of fluid (or charged pixel) either sequentially or simultaneously deposited in a digital manner on the 2D roller surface. The idea of having two different types of fluids/charges is for each "wetted pixel" or charged pixel to then capture a specific powder type with an affinity only to that fluid or charged space. FIG. 4A pixels may have a first affine treatment (AT1) and second affine treatment (AT2). This induced affinity could be of the type selected from a group consisting of fluids, electrostatics, electrophotography, or a combination thereof. Generally, wetted pixels are designed to attract or adhere to a bare metal/ceramic particle (hydrophilic) or to a wax- or polymer-covered metal/ceramic particle (hydrophobic) in the powder beds. FIG. 4B shows the particles that have an attraction to applied induced affinity AT1 and AT2. Roll 330 is labeled as 330B to indicate that powder particles (450) are attached to the surface of the roll based on their respective affinity.

Figure 5A:
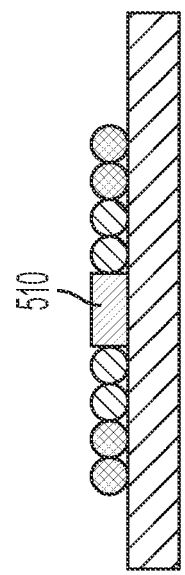
FIGS. 5A and 5B show the introduction of support material by either inkjet deposition (5A) of a liquid wax that solidifies or by doctoring a support powder material.(5B) in accordance to an embodiment.
Figure 5A:
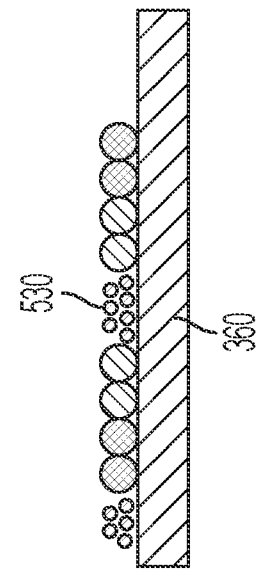
Figure 5B:
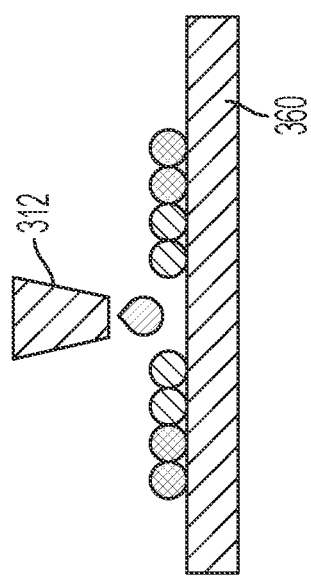
Figure 5B:
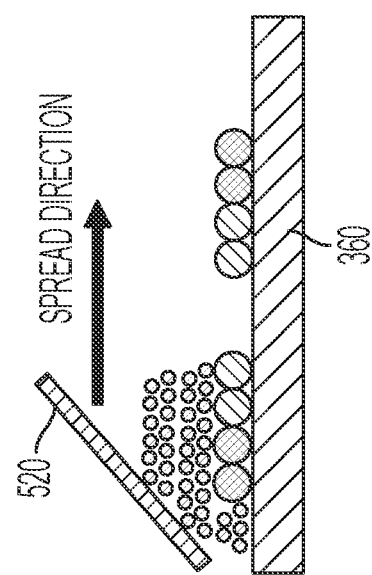

FIGS. 5A and 5B show the introduction of exemplary support material by either inkjet deposition (5A) of a liquid wax that solidifies or by doctoring a support powder material (FIG. 5B) in accordance to an embodiment. The applied material is a separate sacrificial support material. The role of support material in 3D printers is to provide a platform for overhanging geometries on subsequent layers during bottom-up, layer-by-layer fabrication; weak solidifying materials that can be washed away or dissolved are typically used as support. A related approach uses wax as a support material; the wax hardens soon after deposition and is melted away in a post-processing purging step. As used herein, "support" refers to materials that can satisfy this structural requirement and at the same time be easy to remove. Examples include polymer powders such as polyvinyl alcohol, polylactic acid, waxes which have defined melting temperatures, loose powder materials, salts, other water-soluble or organic-solvent soluble powder feedstocks, etc. Support material can be introduced by either inkjet deposition 312 of a liquid wax 505 that solidifies 510 or by doctoring 520 a support powder material 535 at the build platform 360 or substrate or previously formed powder slice. In case the support material is to be doctored 520, the support material will be comprised of powders with mean particle size lower than the mean particle size for the main feedstock to facilitate easy doctoring. For example, for mean particle sizes of 10 microns for the metal or ceramic powders, the doctored material may comprise of wax or polymer particles with mean particle sizes of 1-3 microns. These support materials could be designed to burn off during post-print sintering, to melt away at elevated temperature or to be removed by de-powdering.

It should be appreciated that planarization of a deposited layer maybe done in some embodiments prior to the deposition of another layer. The planarization process may occur after the introduction of support material, in case support material is used, or simply after full deposition of a layer but prior to the deposition of the succeeding one. Planarization establishes a flat surface onto which the succeeding layer will be deposited and is essential in removing proud, irregular features that may result in leveling and other print defects for succeeding layers. These proud, irregular features may result from powder feedstock placement, from the inherent size dispersity of the powder feedstock (e.g. large particles or agglomerates), or from the introduction of support material. Planarization may consist of running a heavy roller to compact and flatten the deposited surface or running a sharp edge or doctoring blade along the surface at an intended height to remove proud, loose features above certain gap spacing. In the case when the support material is wax or some other heated powder, the planarization may be applied during the state when the wax is sufficiently warm and molten and where the action of either running a roller or a doctor blade imposes liquid leveling of the molten material into the prescribed gap.

Figure 6:
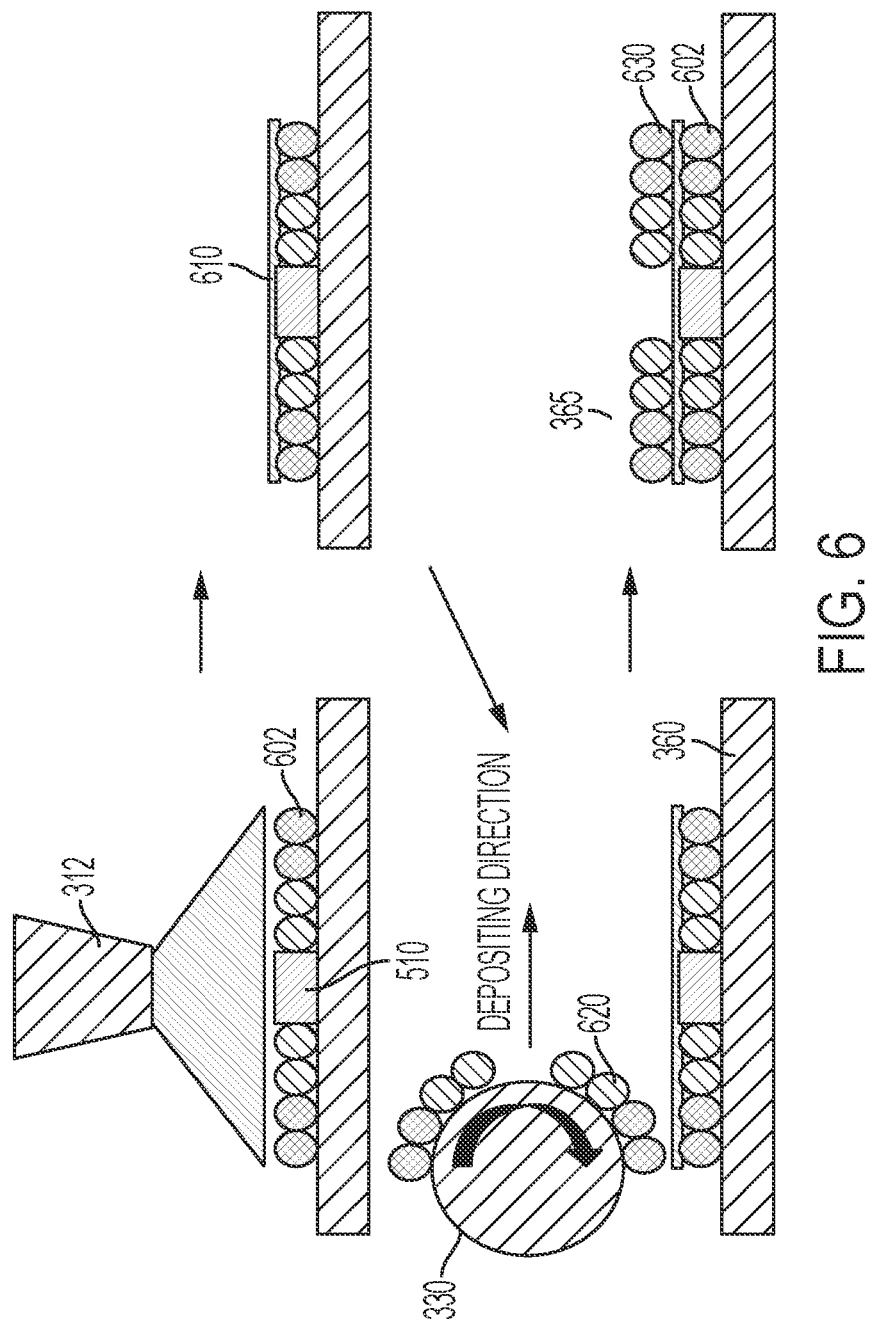
FIG. 6 illustrates x-y placement of adhesive and deposition of two materials to build a succeeding layer on top of the first layer using roller-based deposition in accordance to an embodiment.

FIG. 6 illustrates blanket deposition of an adhesive material across the entire build and selective x-y placement of two materials using roller-based deposition on top of a pre-existing layer which includes support in accordance to an embodiment. In this embodiment, the system and method deposits across the entire build plate 360 an adhesive 610 for facilitating the transfer step from roller 330 of a new layer of powder 620 to pre-existing powder layer 602, In the illustration the adhesive applicator 312 can be positioned to supply adhesive to the substrate 360 (or to the top of layers 602 thereon) before the transfer step. Such adhesive 610 promotes transfer of the layers 630 from the roller 330 to a layer like the pre-existing powder 602 on the substrate 360 or build platform. The adhesive 610 applied by the applicator 312 can be any commercially available adhesive product that is selected to not affect the support 510 or powder materials 365, and can be applied by spraying, rolling, brushing, and the like. The adhesive 610 itself maybe a polymer material such as commercially available epoxies and other fast-curing materials or it can be an inert liquid such as water, silicone or mineral oil with generic affinity to all the different powder materials 365 and where this affinity leads to the powder transfer from roller to part. The adhesive 610 may be removed during post-print sintering or during other finishing processes. Methods for removing this adhesive along with any support material used may include heating such as in a furnace or oven, mechanical means such as vibration, chemically such as a mineral oil or alcohol bath to selectively dissolve the adhesives and/or support.

A 3D printer using a print head like 312 can deposit solidifying and non-solidifying (e.g., adhesive) region or regions within a build platform 360. The roller 330 can then deposit another layer of powder 620 like described with reference to FIG. 2 on adhesive structure 610. The deposited adhesive structure 610, shown sandwiched between the freshly deposited material 630 and the prior layers 602, provides a bonding between layers.

In operation, the roller 330 fabricates 3D objects by depositing the feedstock material by moving the roller onto substrate 360 along a determined pathway. Typically, fabrication of a product is carried out by layer-wise deposition of the feedstock. This planar layered deposition approach to graded materials fabrication enables the placement of multiple powders to create gradients in material composition within the 3D object at finer resolutions than currently enabled by methods dependent on micromixing and extrusion (FIG. 1). This roller-based approach should enable particle placements at resolutions of the order of the particle diameter in the z-direction and of a linear factor of the particle diameter in the x-y directions. Example, for mean particle diameters of about 10 microns, this may correspond to addressable voxel dimensions of approx. 10 microns (z) by 50 microns (y) by 50 microns (x). This corresponds to a voxel volume of 25,000 cubic microns or $2.5 \times 10^{-5}$ microliters. This is several orders of magnitude smaller than the addressable voxel sizes in some extrusion-based systems which are around 0.5-5 microliters, without accounting for the minimum dead volume required for mixing, which imposes different limits on the material gradients that can be fabricated.

Methods 700 and 720 details a process of using rollers to digitally deposit multiple powder types on a substrate like build platform 360 to build a 3D object. The inkjet heads 310 and/or exposure device 320 will expose the roller 330 to record images representing a pixel map of the intended multi-material or graded structure. One image has an affinity to a certain type of build material, another image to another type material, and so forth. These images are then transferred to a substrate-like build platform 360 in successive registration with one another to form a graded structure or 3D part.

Figure 7:
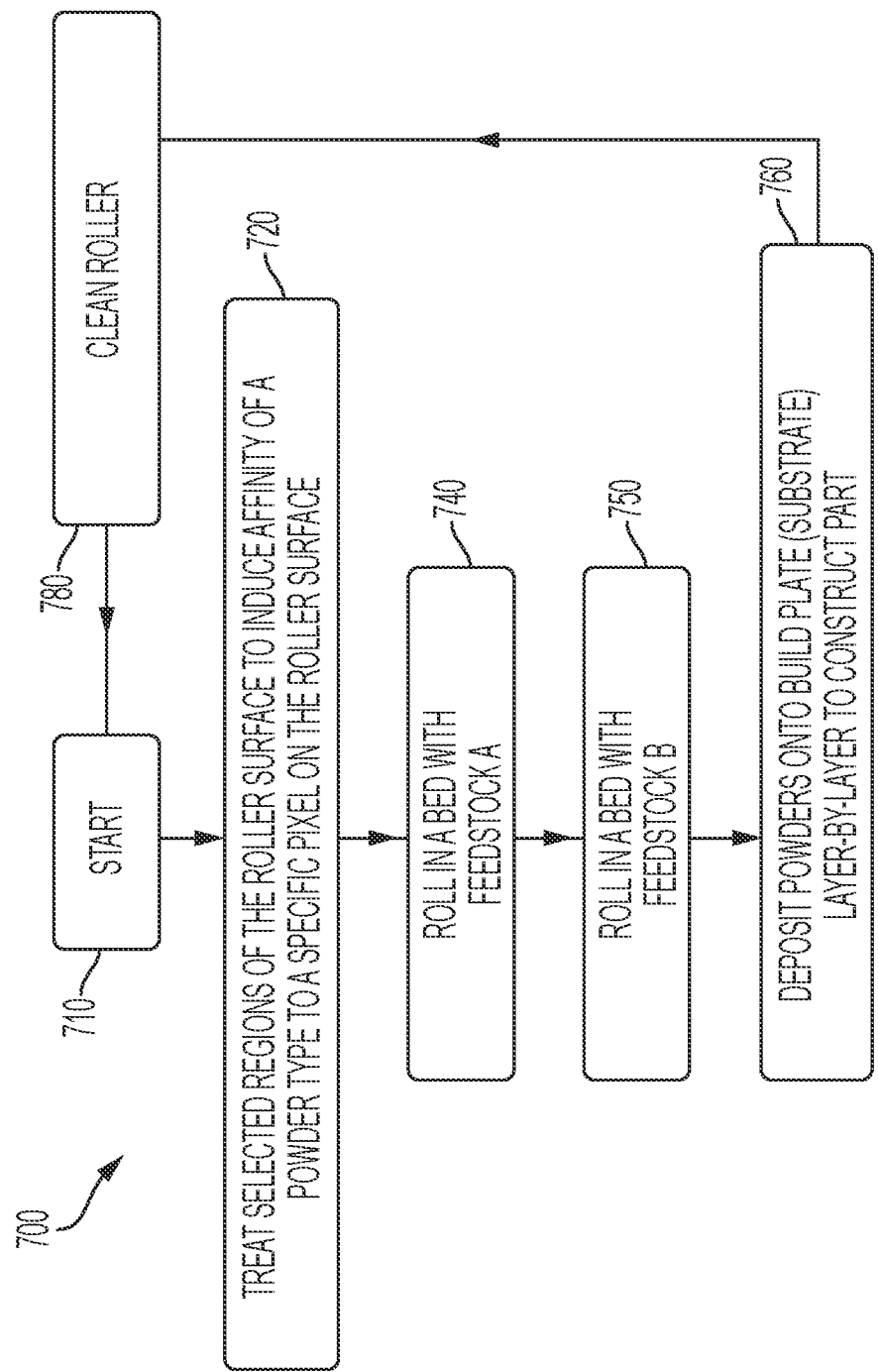
FIG. 7 is a flowchart depicting the operation of a method to fabricate hierarchical graded materials in accordance to an embodiment.

FIG. 7 is a flowchart depicting the operation of a method 700 to fabricate hierarchical graded materials in accordance to an embodiment. Method 700 begins with action 710 where events such as system initialization or like the pressing of the start button to manufacture/fabricate a part or object. For example, manufacturers of metal and ceramic parts for various applications: aerospace, automotive, biomedical, energy and other functional uses. Control is then passed to action 720 where method 700 treats selected regions of the roller surface like roll 330 to induce affinity of a powder type to a specific pixel. FIG. 4A is an example of a selected region that has been acclimated to the different fluid types. Control is then passed to action 740 where the roll 330 is run/rotated across a bed with feedstock of material A. In action 750, the roll 330 is run across a bed with stock of material B. In actions 740 and 750, the controller 120 using a roller module transmits a rotation signal or command to a mechanism such as an electric motor causing the roll 330 to rotate. In similar fashion, the controller 120 using program modules can command another mechanism or the motor having cams and gears to position roll 330 at a selected location like at powder beds 340, 345 or at build platform 360 to pick up affined material and to deliver/deposit the materials attached to its surface.

After running the roller across the powder beds (340, 345), control is then passed to action 760 to cause the roll 330 to run across the build bed 360 or substrate to deposit a slice of the graded materials. The process is repeated until the object is manufactured on a layer-by-layer basis. In action 780, the roller is cleaned using well know methods such as heating such as by IR lamp irradiation, chemical agents, solvents, shaking, or application of electric field like those produced by a corona discharge device. The cleaning 780 may be performed in between layers, after sequence of layers, and or after all the layers have been deposited by roll 330. Note that the actions described in 760 include processes occurring within the action of the main roller for deposition of multiple powders. Once the multi-material powder layer has been transferred into the build, support and adhesive material deposition processes described previously (FIG. 5, 6) may occur prior to the action 710 and then 720 and so forth of depositing a subsequent layer.

Figure 8:
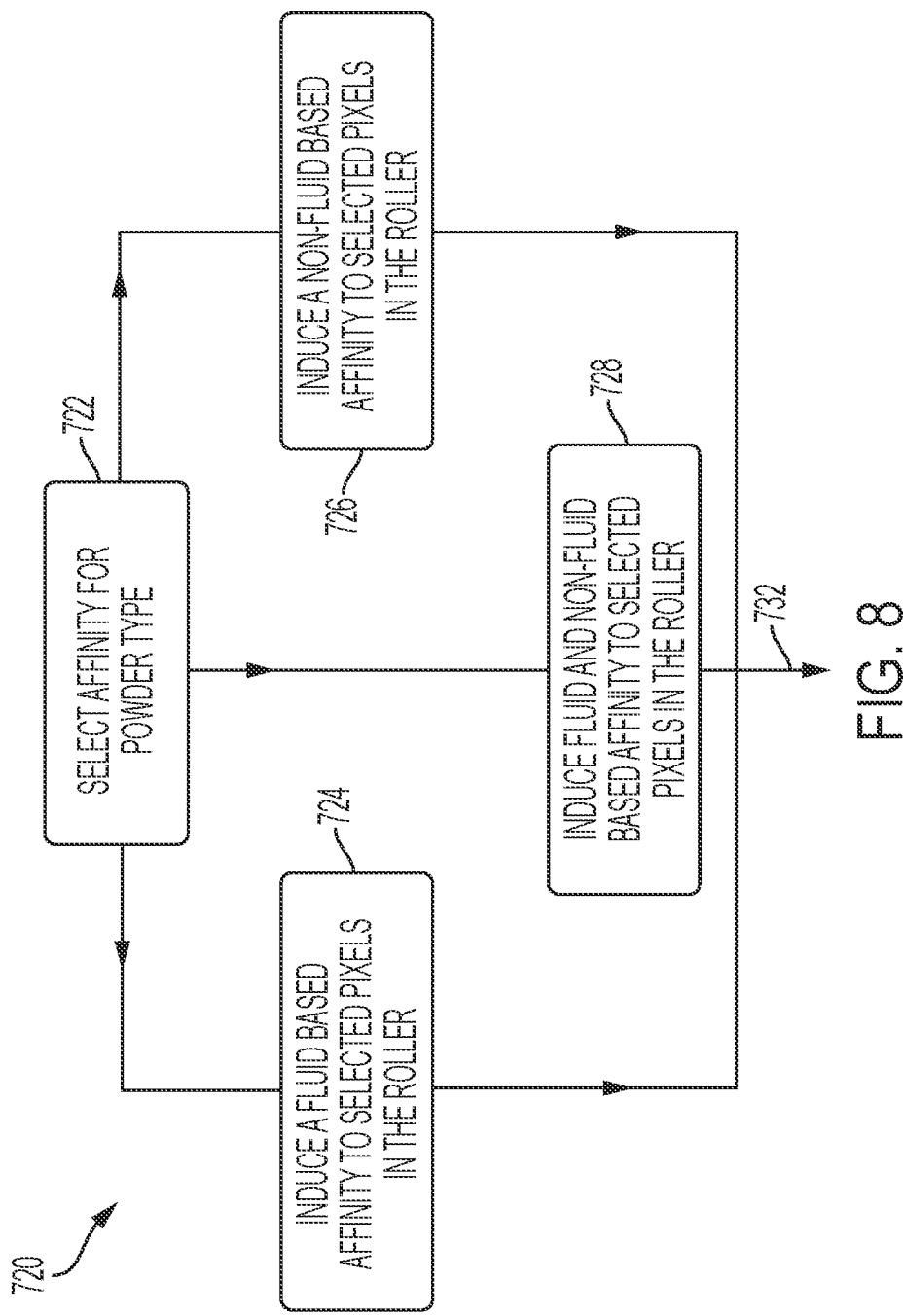
FIG. 8 is a flowchart depicting a method of inducing affinity of a powder type to a specific pixel in the roller in accordance to an environment.

FIG. 8 is a flowchart depicting a method 720 of inducing affinity of a powder type to a specific pixel in the roller in accordance to an environment. Method 720 begins with action 722 where the affinity for the power type is selected. As mentioned above affinity can take the form of fluid type or charged type and the two types can be combined on the surface of roll 330. When fabricating an object two distinct type of materials, such as two or more distinct fluid-powder pairs where each powder feedstock has wetting affinity only to one fluid and not the other or the use of other means to induce temporary particle affinity to the roller surface—e.g. electrophotography, and the like. While described as applying to two distinct materials, method 722 can be extended from two fluid-powder pairs to multiple fluid-powder pairs and to the use of rollers to digitally deposit multiple powder types on a substrate to build a 3D object.

In action 724, a fluid based affinity is induced to those pixels in a selected area of the surface of roll 330.

In action 726, the method induces a non-fluid affinity like electrostatic charges in a selected area of the surface of roll 330.

In action 728 a fluid and non-fluid approaches is selected for inducing affinity on a pixel-by-pixel basis. Control is then passed to action 732 for attracting the appropriate powder for the selected affinity in actions 724, action 726, or action 728.

It will be appreciated that several of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. A method to fabricate a multi-material 3D object, comprising:
    treating selected regions of a roller surface to induce affinity of a plurality of powder types to specific pixels on the roller surface, the treating including depositing a first fluid onto the roller surface and depositing a second fluid different than the first fluid onto the roller surface, each of the first and second fluids being an affinity type inducing affinity of a respective one of the plurality of powder types, the plurality of powder types including first material powder particles and second material powder particles;
    running the roller surface after the treating across one or more powder beds housing the plurality of powder types to cause the first material powder particles to transfer only to the treated selected regions of the roller surface having one of the first fluid and the second fluid thereon, and to cause the second material powder particles to transfer only to the treated selected regions of the roller surface having the other one of the first fluid and the second fluid thereon, thereby causing the plurality of powder types to adhere to the selected regions of the roller surface;

wherein the first material powder particles and the second material powder particles each have an affinity specific to the treated selected regions of the roller surface having the respective one of the first fluid and the second fluid thereon;

fabricating the multi-material 3D object in a layer-by-layer basis by simultaneously depositing the first material powder particles and the second material powder particles from the roller surface onto a substrate.

2. The method in accordance to claim 1, wherein the running the roller surface after the treating across one or more powder beds housing the plurality of powder types includes rolling the roller surface with the affinity types in direct contact with the first material powder particles and the second material powder particles as the powder particles are housed by the one or more powder beds.

3. The method in accordance to claim 1, the method further comprising:

applying support material in a layer-wise manner according to a pattern defined for supporting the multi-material 3D object during fabrication, wherein a layer of support material is applied subsequent to forming a corresponding layer of the plurality of powder types on the substrate.

4. The method in accordance to claim 1, the method further comprising:

supplying adhesive to the substrate, wherein the adhesive promotes transfer of the plurality of powder types from the roller surface to the substrate or to a pre-existing layer of the plurality of powder types on the substrate.

5. The method in accordance to claim 1, wherein the treating uses the first fluid and the second fluid from at least one reservoir adapted to supply the fluids to multiple print heads.

6. The method in accordance to claim 5, the method further comprising:

actuating at least one of the multiple print heads in communication with the at least one reservoir for the depositing of a defined volume of 2-50 picoliters of at least one of the first fluid and the second fluid on the selected regions of the roller surface.

7. The method in accordance to claim 1, wherein the running the roller surface after the treating across the one or more powder beds causes the plurality of powder types to adhere to the selected regions of the roller surface in a single pass of the roller surface across the one or more powder beds.

8. The method in accordance to claim 1, further comprising inducing simultaneous affinity of a plurality of powder types to specific pixels on the roller surface via the treating.

9. The method in accordance to claim 1, wherein the first material powder particles and the second material powder particles are selected from a group consisting of metallic, ceramic, alloy, low-temperature alloy, high-temperature alloy, nonmetallic, polymeric, composite materials and mixtures thereof that permits deposition of the powder on the substrate.

10. The method in accordance to claim 1, the method further comprising:

supplying adhesive to the substrate, the adhesive promoting transfer of the plurality of powder types on the roller surface to the substrate or to a pre-existing layer of the plurality of powder types on the substrate;

wherein an applied energy causes fluids on the selected regions of the roller surface to evaporate to thereby release the first material powder particles and the second material powder particles.

11. The method of claim 1, further comprising forming a patterned layer of functional graded material via the simultaneous deposition of the first material powder particles and the second material powder particles, the patterned layer of functional graded material having a resolution of material gradients at the first material powder particle and the second material powder particle size.

12. The method in accordance to claim 11, wherein the resolution of material gradients is less than or equal to a mean particle diameter of one of the first material powder particle and the second material powder particle: 10-1000 microns in x-y and 1-100 microns in z, leading to a composition-addressable voxel volume of 5-100 picoliters.

13. The method in accordance to claim 12, the method further comprising:

depositing support material in a layerwise manner according to a pattern defined for supporting the functional graded materials during fabrication, wherein a layer of support material is applied subsequent to forming a corresponding layer of the first material powder particles and the second material powder particles on the substrate;

planarizing the just applied layer, which may consist of mixture of the deposited first material powder particles, the second material powder particles and support material.

14. A system for fabricating a multi-material 3D object, comprising:

a treatment subsystem to treat selected regions of a roller surface to induce affinity of a plurality of powder types to specific pixels on the roller surface, the treating including depositing a first fluid onto the roller surface and depositing a second fluid different than the first fluid onto the roller surface, each of the first and second fluids being an affinity type inducing affinity of a respective one of the plurality of powder types, the plurality of powder types including first material powder particles and second material powder particles;

one or more powder beds housing the plurality of powder types, wherein the first material powder particles and the second material powder particles each have an affinity specific to the treated selected regions of the roller surface having the respective one of the first fluid and the second fluid thereon;

at least one processor configured to execute code, including:

a roller module configured to run the roller surface after the treating across the one or more powder beds to cause the first material powder particles to transfer only to the treated selected regions of the roller surface having one of the first fluid and the second fluid thereon, and to cause the second material powder particles to transfer only to the treated selected regions of the roller surface having the other one of the first fluid and the second fluid thereon, thereby causing the plurality of powder types to adhere to the selected regions of the roller surface;

a fabrication module configured to simultaneously deposit the first material powder particles and the second material powder particles from the roller surface to onto a substrate so as to fabricate the multi-material 3D object in a layer-by-layer basis.

15. The system in accordance to claim 14, wherein the roller module configured to run the roller surface is further configured to roll the roller surface with the affinity types in direct contact with the first material powder particles and the second material powder particles as the powder particles are housed by the one or more powder beds.

16. The system in accordance to claim 14, the treatment subsystem further comprising at least one reservoir that supplies fluids to multiple print heads.

17. The system in accordance to claim 14, the processor further comprising: an actuator module configured to actuate at least one of the multiple print heads in communication with the at least one reservoir for the depositing of a defined volume of 2-50 picoliters of at least one of the first fluid and the second fluid on the selected regions of the roller surface.

18. The system in accordance to claim 14, wherein the roller module configured to run the roller surface after the treating across the one or more powder beds causes the plurality of powder types to adhere to the selected regions of the roller surface in a single pass of the roller surface across the one or more powder beds.

19. The system in accordance to claim 14, wherein the treatment subsystem induces simultaneous affinity of a plurality of powder types to specific pixels on the roller surface via the treating.

20. The system in accordance to claim 14, wherein the first material powder particles and the second material powder particles are selected from a group consisting of metallic, ceramic, alloy, low-temperature alloy, high-temperature alloy, nonmetallic, polymeric, composite materials and mixtures thereof that permits deposition of the powder on the substrate.

21. The system in accordance to claim 14, wherein the fabrication module is further configured to form a patterned layer of functional graded material via the simultaneous deposition of the first material powder particles and the second material powder particles, the patterned layer of functional graded material having a resolution of material gradients at the first material powder particle and the second material powder particle size, the processor further comprising:
an applicator module configured to deposit support material in a layerwise manner according to a pattern defined for supporting the functional graded materials during fabrication, wherein a layer of support material is applied subsequent to forming a corresponding layer of the first material powder particles and the second material powder particles on the substrate.

22. The system in accordance to claim 14, wherein the applicator module is further configured to supply adhesive to the substrate, the adhesive promotes transfer of the plurality of powder types on the roller surface to the substrate or to a pre-existing layer of the plurality of powder types on the substrate;
the processor further including an energy applicator module configured to apply energy to the selected regions of the roller surfaces and cause fluids on the selected regions of the roller surface to evaporate to thereby release the first material powder particles and the second material powder particles.

* * * * *